(12) United States Patent
Yamashita et al.

(10) Patent No.: US 7,835,138 B2
(45) Date of Patent: Nov. 16, 2010

(54) SOLID ELECTROLYTIC CAPACITOR AND METHOD OF MANUFACTURING SAME

(75) Inventors: Daisuke Yamashita, Miyagi (JP); Kazuhiro Koike, Miyagi (JP); Kazuyuki Kato, Miyagi (JP); Masako Ohya, Miyagi (JP); Kunihiko Shimizu, Miyagi (JP)

(73) Assignee: NEC Tokin Corporation, Miyagi (JP)

( * ) Notice: Subject to any disclaimer, the term of this patent is extended or adjusted under 35 U.S.C. 154(b) by 337 days.

(21) Appl. No.: 12/044,337

(22) Filed: Mar. 7, 2008

(65) Prior Publication Data

US 2009/0059479 A1  Mar. 5, 2009

(30) Foreign Application Priority Data

Sep. 3, 2007   (JP) ............................ 2007-059927

(51) Int. Cl.
    *H01G 9/00* (2006.01)
(52) U.S. Cl. .................. 361/523; 361/516; 361/519; 361/525; 361/528; 361/529; 29/25.01; 29/25.03
(58) Field of Classification Search .................. 361/523, 361/516–519, 525, 528–529, 530, 540–541; 29/25.01, 25.03
See application file for complete search history.

(56) References Cited

U.S. PATENT DOCUMENTS

| | | | |
|---|---|---|---|
| 5,005,107 A * | 4/1991 | Kobashi et al. ............. 361/540 |
| 6,236,561 B1 * | 5/2001 | Ogino et al. ................. 361/523 |
| 6,249,424 B1 * | 6/2001 | Nitoh et al. .................. 361/523 |
| 6,392,869 B2 * | 5/2002 | Shiraishi et al. ............. 361/523 |
| 6,430,034 B2 * | 8/2002 | Sano et al. ................... 361/528 |
| 6,625,009 B2 * | 9/2003 | Maeda ......................... 361/528 |
| 6,882,519 B2 * | 4/2005 | Uzawa et al. ................ 361/523 |
| 6,912,117 B2 * | 6/2005 | Arai et al. .................... 361/523 |
| 6,920,037 B2 * | 7/2005 | Sano et al. ................... 361/540 |
| 7,057,882 B2 * | 6/2006 | Fujii et al. ................... 361/540 |
| 7,215,533 B2 * | 5/2007 | Kurita et al. ................. 361/523 |

FOREIGN PATENT DOCUMENTS

| | | |
|---|---|---|
| JP | 2001-52961 | 2/2001 |
| JP | 2004-228424 | 8/2004 |
| JP | 2005-101418 | 4/2005 |
| JP | 2005-197457 | 7/2005 |

\* cited by examiner

*Primary Examiner*—Nguyen T Ha
(74) *Attorney, Agent, or Firm*—Whitham Curtis Christofferson & Cook, PC (57) ABSTRACT

A solid electrolytic capacitor is provided in which volume efficiency of its capacitor element is improved. A converting substrate having an anode terminal forming portion and cathode terminal portion obtained by forming notches on faces exposed on outside faces of the anode and cathode portions and performing plating in the notches in portions in which the anode and cathode portions of a lower-face electrode type solid electrolytic capacitor is connected to the capacitor element and, after a sheathing resin is formed therein, the sheathed portion and converting substrate are cut along cutting planes to form fillet forming faces on the outside faces of the anode portion and cathode portion of the lower-face electrode type solid electrolytic capacitor.

8 Claims, 11 Drawing Sheets

SOLID ELECTROLYTIC CAPACITOR AND METHOD OF MANUFACTURING SAME

INCORPORATION BY REFERENCE

This application is based upon and claims the benefit of priority from Japanese Patent Application No. 2007-059927, filed on Mar. 9, 2007, the disclosure of which is incorporated herein in its entirely by reference.

BACKGROUND OF THE INVENTION

1. Field of the Invention

The present invention relates to a solid electrolytic capacitor and a method for manufacturing the solid electrolytic capacitor and more particularly to a lower-face electrode type solid electrolytic capacitor having electrode terminals directly drawn on a mounted electrode face of a substrate and the method for manufacturing the same.

2. Description of the Related Art

Conventionally, a solid electrolytic capacitor employing tantalum, niobium, or a like as a valve metal, owing to its small-sized configuration, its large electrostatic capacitance, and its excellent frequency characteristic, is widely used in a decoupling circuit of a CPU (Central Processing Unit), power circuit, or a like. Also, as a portable-type electronic device develops, commercialization of the lower-face electrode type solid electrolytic capacitor, in particular, is in progress.

When the lower-face electrode type solid electrolytic capacitor of this type is to be mounted on an electronic circuit substrate, not only a terminal portion of a substrate mounted electrode face of the lower-face electrode type solid capacitor but also a terminal portion called a "solder fillet" mounted on the side of the lower-face electrode type solid electrolytic capacitor becomes an important factor.

The reason for the above is that quality of mounting connection of the capacitor or a like can be confirmed by observing presence or absence of solder existing beside the fillet after a soldering process is completed since there is a fear of the inconvenience that an electrolytic capacitor is mounted in an inclined state if solder does not wet up equally both on anode and cathode sides, for example, when the solder being molten on a fillet forming face wets up.

To resolve the inconvenience of this kind, a lower-face electrode type solid electrolytic capacitor having a configuration in which a plating process is performed in a terminal portion (on fillet forming face) where a soldering fillet is formed is disclosed (see, for example, Patent References 1 [Japanese Patent Application Laid-open No. 2001-52961] and 2 [Japanese Patent Application Laid-open No. 2004-228424]). In the configurations of the disclosed solid electrolytic capacitor, since the plating process is performed on the fillet forming face, the wetting-up of solder is improved, however, there is a disadvantage in manufacturing processes that, after the cutting of a converting substrate or electrode terminal of a lead frame, or a like, the plating process is required on the fillet forming face, thus causing the addition and complication of processes, increase in costs, or a like.

Figure 12A:
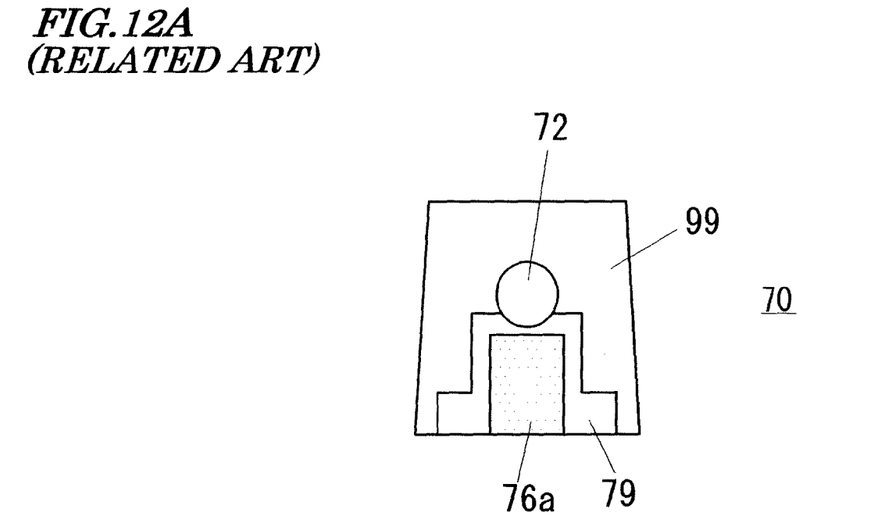
FIG. 12A is a side view showing an anode side of the solid electrolytic capacitor.
Figure 12B:
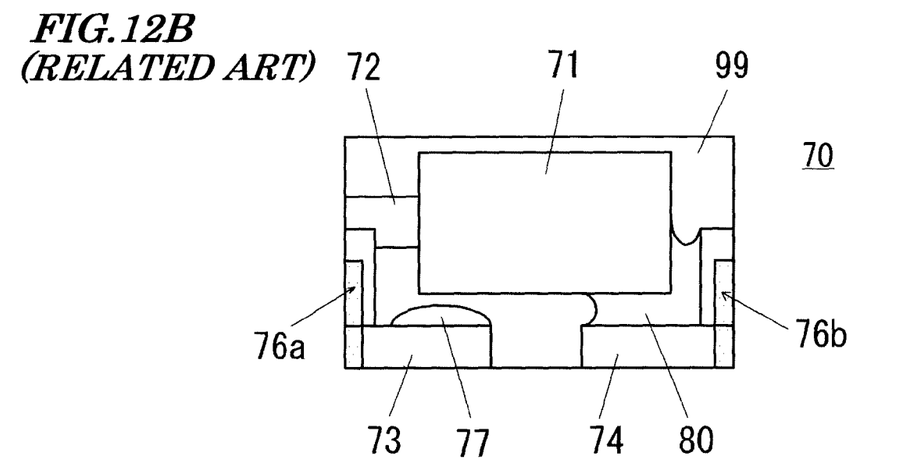
FIG. 12B is an internal perspective view from a front.
Figure 12C:
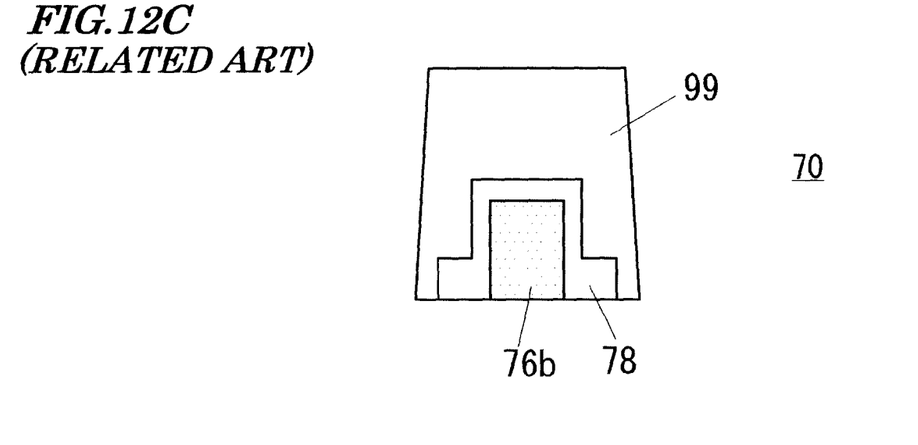
FIG. 12C is a side view showing a cathode side of the solid electrolytic capacitor.

To resolve the disadvantage in manufacturing processes as above, a lower-face electrode type solid electrolytic capacitor having a configuration in which a concave portion is formed on an electrode terminal and a plating processed face is formed in the concave portion to form a fillet forming face (see Patent References 3 [Japanese Patent Application Laid-open No. 2005-101418] and 4 [Japanese Patent Application Laid-open No. 2005-197457]). FIGS. 12A, 12B, and 12C are diagrams showing the lower-face mounted electrolytic type solid electrolytic capacitor 70 disclosed in the Patent Reference 4 and FIG. 12A is a side view showing an anode side of the solid electrolytic capacitor 70, FIG. 12B is an internal perspective view from its front, and FIG. 12C is a side view showing a cathode side of the solid electrolytic capacitor 70. The reference number 71 shows a capacitor element, the number 72 shows an anode lead line, the number 73 shows an anode terminal of a lower-face electrode type solid electrolytic capacitor 70, the number 74 shows a cathode terminal of the lower-face electrode type solid electrolytic capacitor 70, the number 76a shows a plated fillet forming face on its anode side, the number 76b shows a plated fillet forming face on its cathode side, the number 79 is an appropriately -shaped section on its anode side, the number 77 shows an insulating resin employed therein, the number 78 shows a section on its cathode side, the number 99 shows a sheathing resin employed therein, and the number 80 shows a conductive adhesive employed therein. In the FIG. 12B, the dotted portion shows the concave portion on an inner face of which a plating process is performed and one face of which is the fillet forming face 76a and another face of which is the fillet forming face 76b.

Figure 13:
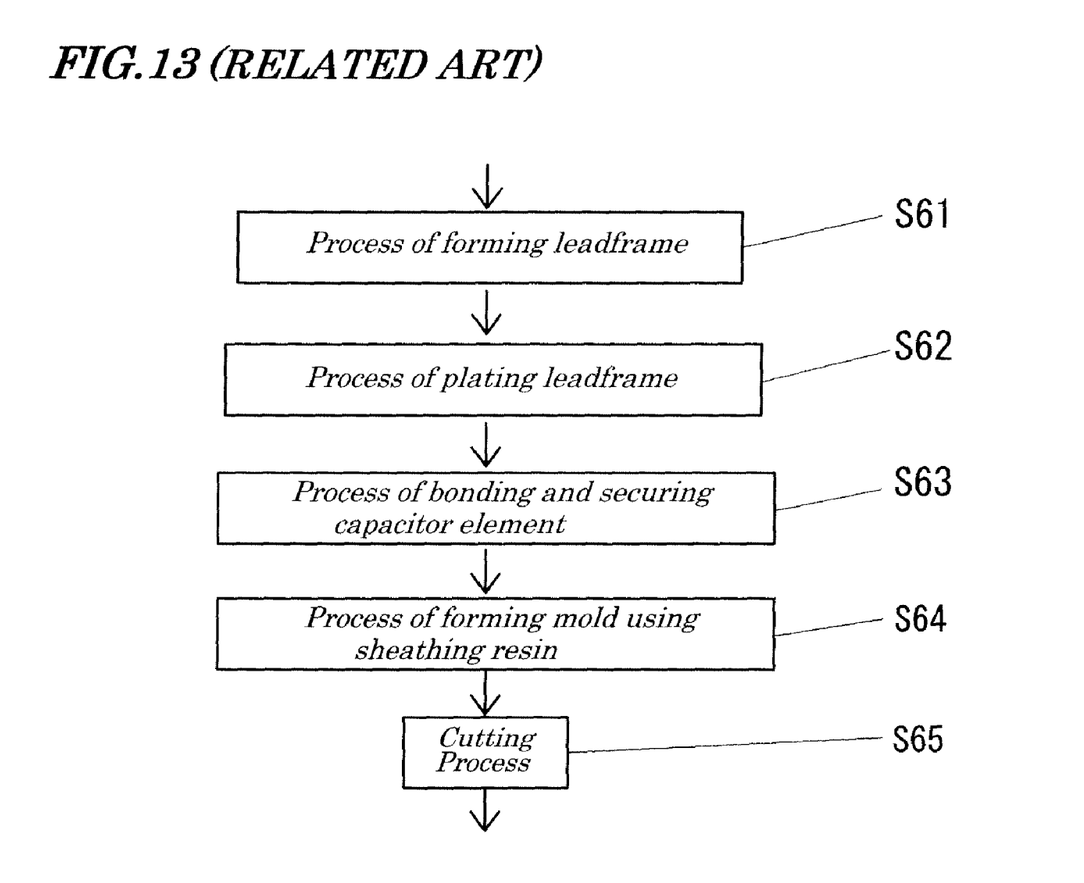
FIG. 13 is a process flow diagram explaining conventional technology.
Figure 14:
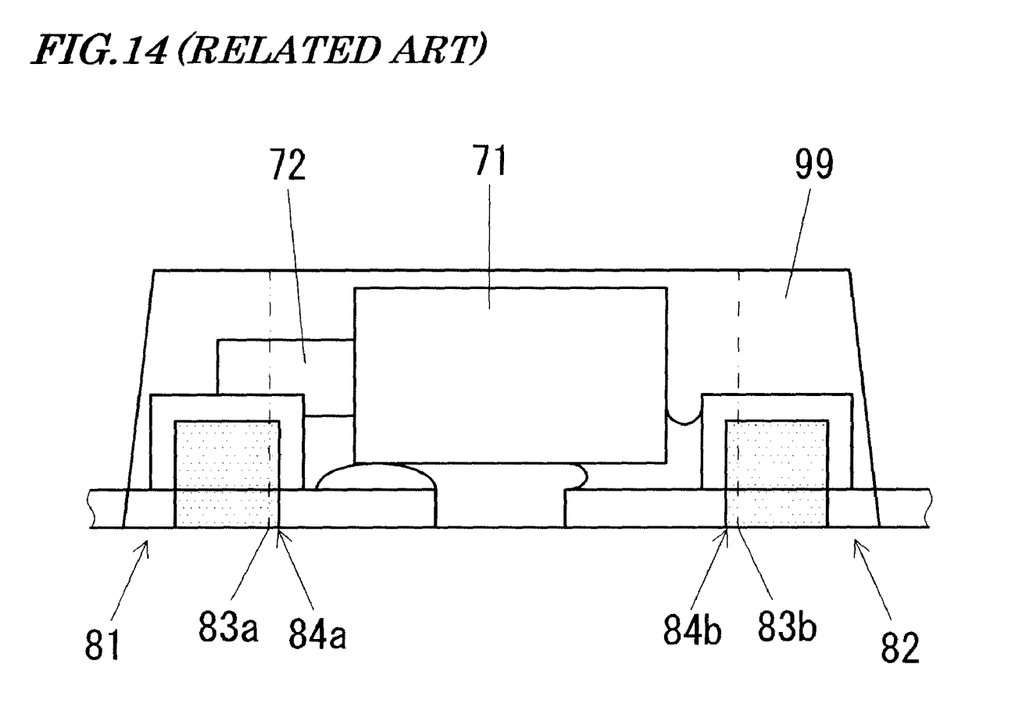
FIG. 14 is an internal perspective diagram explaining the conventional technology.

These processes are described by referring to FIGS. 13 and 14. FIG. 13 is a process flow diagram disclosed in the Patent Reference 3. In FIG. 13, Step S61 shows a process of forming a leadframe, Step S62 shows a process of plating the leadframe, Step S63 shows a process of bonding and securing the capacitor element 71 to the leadframe, Step S64 shows a process of forming a mold using the sheathing resin 99, Step S65 shows a process of cutting the sheathing resin 99 and leadframe. A state in which the capacitor element 71 is bonded to the leadframe and the mold is formed using the sheathing resin 99 is shown in FIG. 14. In FIG. 14, the reference number 81 shows a leadframe anode terminal forming portion, the number 82 shows a leadframe cathode terminal forming portion, the numbers 83a and 83b are cutting planes, the numbers 84a and 84b show concave portions serving as fillet forming faces after being cut. Thus, according to the Patent References 3 and 4, by forming a concave portion (dotted portion) processed by plating, the process of the plating following the cutting process is made unnecessary.

However, the disclosed technologies have problems in that the formation of the concave portion of electrode terminals within outer dimensions of the lower-face electrode type solid electrolytic capacitor is required which causes a difficulty in the improvement of volume efficiency of the capacitor element and it is made difficult to stably form fillet forming faces to be used for cutting in the concave portion in which solder is formed.

In the lower-face electrode type solid electrolytic capacitor in which its minimization is required, to achieve further minimization, the improvement of volume efficiency of the capacitor element relative to the outer dimensions of the lower-face electrode type solid electrolytic capacitor is indispensable. However, in the conventional method as shown in FIG. 12 in which concave and convex portions are formed in the leadframe using a throttling process or a like and fillet forming faces 76a and 76b processed by plating are formed in the concave and convex portions, the formation of the plated fillet forming faces 76a and 76b within the outer dimensions of the lower-face electrode type solid electrolytic capacitor is required. This conventional method presents problems. That is, in order to obtain such the plated fillet forming faces 76a and 76b, it is necessary to accept some additional increases in volume and, as a result, the improvement of volume efficiency of the lower-face electrode type solid electrolytic capacitor is blocked and another problem arises that stable formation of the fillet forming face due to the cutting of the concave portion is made difficult.

SUMMARY OF THE INVENTION

In view of the above, it is an object of the present invention to provide a lower-face electrode type solid electrolytic capacitor which is excellent in productivity and is capable of achieving the improvement of volume efficiency and a method for manufacturing the same.

According to a first exemplary aspect of the present invention, there is provided a (lower-face electrode type) solid electrolytic capacitor including a capacitor element having an anode portion made of a valve metal, a dielectric layer made of an oxide of the valve metal, and a cathode portion made of a solid electrolyte layer; and a converting substrate being electrically connected to the capacitor element on its upper face and having an anode terminal and cathode terminal as an electrode terminal for mounting the solid electrolytic a capacitor on its lower face;

wherein, in a specified region on a side end face of the converting substrate, a plated anode fillet forming portion and plated cathode fillet forming portion are formed which control fillets formed when the anode terminal and the cathode terminal on the lower face of the converting substrate are each soldered to a corresponding portion of a circuit substrate, whereby the solid electrolytic capacitor is mounted on the circuit substrate.

According to a second exemplary aspect of the present invention, there is provided a method of manufacturing the solid electrolytic capacitor including:

a step of bonding a capacitor element to a converting substrate, on an upper face of which there are formed at least one anode region and at least one cathode region for being electrically connected to the capacitor element, and on a lower face of which there are formed at least one anode terminal and at least one cathode terminal as an electrode terminal for mounting a capacitor, at least one first plated concave portion or at least one first plated through hole for forming a plated anode fillet forming portion, and at least one second plated concave portion or at least one second plated through hole for forming a plated cathode fillet forming portion and the capacitor element having an anode portion made of a valve metal, a dielectric layer made of an oxide of the valve metal, and a cathode portion made of a solid electrolyte layer;

a step of coating upper faces of the capacitor element and the converting substrate with a sheathing resin; and a step of completing the plated anode fillet forming portion and the plated cathode fillet forming portion by cutting the converting substrate and the sheathing rein in a manner to partition the first and second plated concave faces or the first and second plated through holes.

With the above configurations, the lower-face electrode type solid electrolytic capacitor is fabricated by cutting the outside shape of the converting substrate having the plated concave face or plated through hole formed on its lower face so that part of the plated portion and, therefore, volume efficiency of the capacitor element relative to the outside shape of the lower-face electrode type solid electrolytic capacitor can be improved and, further, the fillet forming faces (anode fillet forming portion and cathode forming portion) can be formed stably, thus enabling productivity of the electrolytic capacitor to be increased.

BRIEF DESCRIPTION OF THE DRAWINGS

The above and other objects, advantages, and features of the present invention will be more apparent from the following description taken in conjunction with the accompanying drawings in which:

FIGS. 1A to 1C are a diagram showing a lower-face electrode type solid electrolytic capacitor according to a first exemplary embodiment of the present invention.

FIGS. 3A and 3B are a diagram showing configurations of a converting substrate employed in the first exemplary embodiment of the present invention.

FIGS. 5A to 5D are a diagram showing a lower-face electrode type solid electrolytic capacitor according to a second exemplary embodiment of the present invention; FIG. 5C is an internal perspective view from a rear and FIG. 5A is a side view showing a cathode side of the solid electrolytic capacitor;

FIGS. 7A to 7D are a diagram showing configurations of a converting substrate employed in the second exemplary embodiment of the present invention.

FIGS. 8A to 8D are a diagram showing a layer-stacked lower-face electrode type solid electrolytic capacitor according to a third exemplary embodiment of the present invention.

FIGS. 9A, 9B, 9C, and 9D are a diagram showing configurations of a converting substrate employed in the third exemplary embodiment of the present invention.

FIGS. 12A to 12C are diagrams showing a conventional lower-face electrode type solid electrolytic capacitor.

DETAILED DESCRIPTION OF THE PREFERRED EXEMPLARY EMBODIMENTS

In the best mode of the solid electrolytic capacitor of the present invention, in a specified region on a side end face of a converting substrate, a plated anode fillet forming portion $15a$ and plated cathode fillet forming portion $15b$ are formed which control fillets formed when an anode terminal 23 and a cathode terminal 24 on a lower face of the converting substrate are each soldered to a corresponding portion of a circuit substrate, whereby the solid electrolytic capacitor is mounted on the circuit substrate. The plated anode fillet forming portion and plated cathode fillet forming portion are preferably formed in a manner to be extended from an anode terminal and cathode terminal on a lower face of the converting substrate. The plated anode fillet forming portion and plated cathode forming portion may be formed in an inclined portion or concave portion obtained by removing an angular portion corresponding to an angle formed between a lower face and a side end face of the converting substrate or may be formed on a concave face formed on a side end face of the converting substrate.

Also, in the best mode of the present invention, a converting substrate is used which has the same electrical configuration as the converting substrate described above except the anode fillet forming portion and the cathode forming portion and being longer than the converting substrate described above and having a plated concave portion or plated through hole on its lower face. To this converting substrate is coupled a capacitor element and, after upper faces of the capacitor element and converting substrate are coated with a sheathing resin, the converting substrate and sheathing resin are cut in a manner to partition the plated concave portion or through hole to complete a plated anode fillet forming portion and plated cathode fillet forming portion.

First Exemplary Embodiment

Figure 1A:
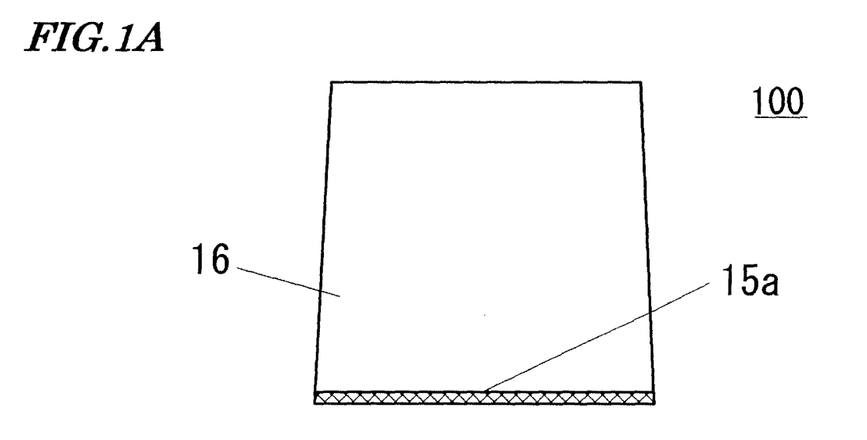
FIG. 1A is a side view showing an anode side of the solid electrolytic capacitor.
Figure 1B:
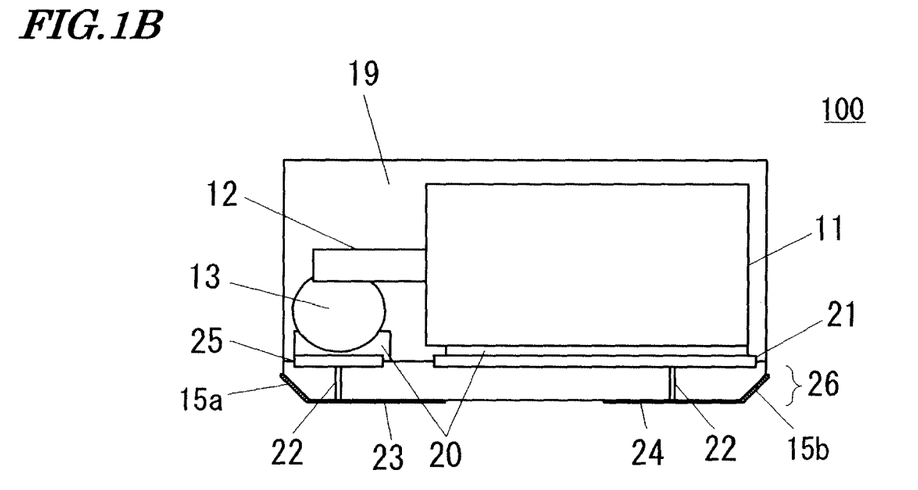
FIG. 1B is an internal perspective view from its front.
Figure 1C:
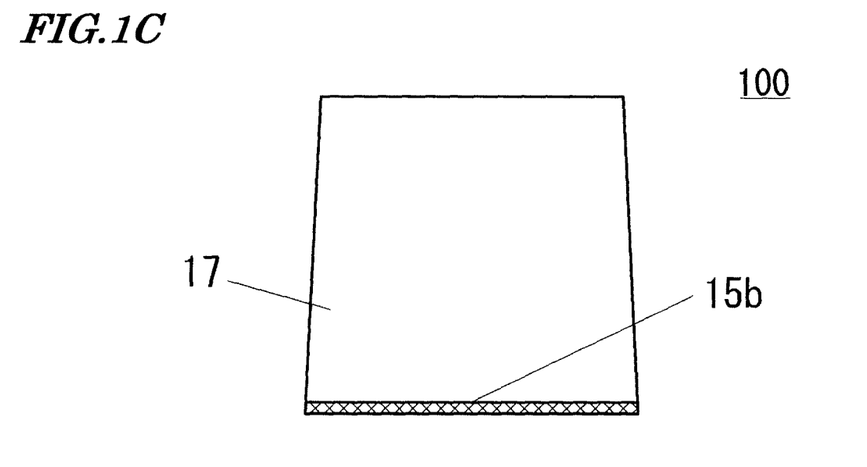
FIG. 1C is a side view showing a cathode side of the solid electrolytic capacitor.

FIGS. 1A, 1B, and 1C are diagrams showing a lower-face electrode type solid electrolytic capacitor 100 according to the first exemplary embodiment of the present invention, FIG. 1A is a side view showing an anode side of the solid electrolytic capacitor 100, FIG. 1B is an internal perspective view from a front of the solid electrolytic capacitor 100, and FIG. 1C is a side view showing a cathode side of the solid electrolytic capacitor 100. In FIGS. 1A, 1B, and 1C, the reference number 11 shows a capacitor element, the number 12 shows an anode lead line, the number 13 shows a metal piece, the number $15a$ shows a plated fillet forming face on an anode side of the solid electrolytic capacitor 100, the number $15b$ shows a plated fillet forming face on a cathode side of the solid electrolytic capacitor 100, the number 16 shows a cutting plane on the anode side, the number 17 shows a cutting plane on the cathode side, the number 19 shows a sheathing resin, the number 20 shows a conductive adhesive, the number 21 shows a cathode portion on a capacitor element connecting face, the number 22 shows through holes, the number 23 shows an anode portion on a capacitor mounted electrode face, the number 24 is a cathode portion on the capacitor mounted electrode face, the number 25 shows an anode portion on the capacitor element connecting face and the number 26 shows a converting substrate.

Figure 3A:
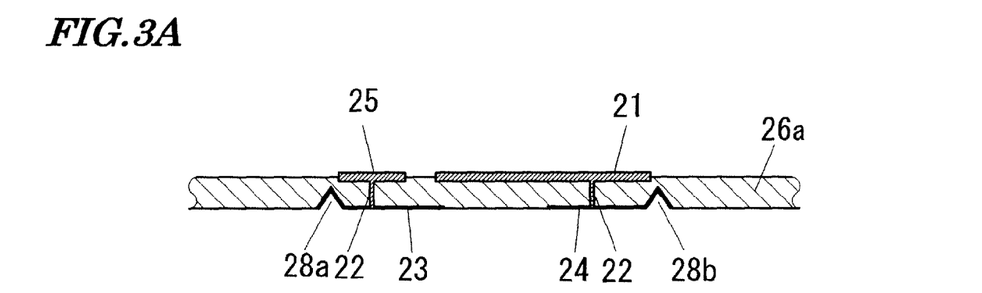
FIG. 3A is a cross-sectional view of the converting substrate.
Figure 3B:
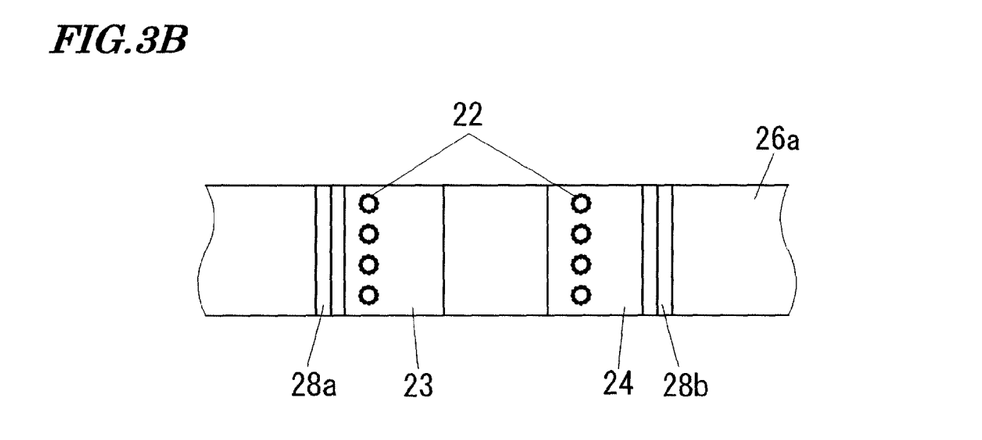
FIG. 3B is a bottom view of the converting substrate seen from a side of a capacitor mounted electrode face.

Next, the converting substrate 26 making up the lower-face electrode type solid electrolytic capacitor 100 is described by referring to FIGS. 3A and 3B. FIGS. 3A and 3B are a diagram showing configurations of the converting substrate 26 employed in the first exemplary embodiment of the present invention, FIG. 3A is a cross-sectional view of the converting substrate 26 and FIG. 3B is a bottom view of the converting substrate 26 seen from a side of the capacitor mounted electrode face. The converting substrate 26 has a function of changing the anode portion and cathode portion operating in the lower-face electrode type solid electrolytic capacitor 100 from the anode portion and cathode portion of the capacitor element to the anode portion and cathode portion on the capacitor mounting electrode face. In FIGS. 3A and 3B, the reference number 25 shows an anode portion on the capacitor element connecting face which is electrically connected to the metal piece 13 (anode lead line 12) through the conductive adhesive 20. The number 21 shows a cathode portion on the capacitor element connecting face which is coupled to the capacitor element 11 through the conductive adhesive 20. The number 23 shows an anode portion on the capacitor mounted electrode face. The number 24 is a cathode portion on the capacitor mounted electrode face. The above anode portion 25 and cathode portion 21 on the capacitor element connecting face and the anode portion 25 and cathode portion 21 on the capacitor mounting electrode face are formed using a copper foil or a like on the insulating substrate $26a$ with a thickness of about 100 to 120 μm. To achieve electric conduction between the anode portion 25 on the capacitor element connecting face and the anode portion 23 on the capacitor mounted electrode face and between the cathode portion 21 on the capacitor element connecting face and the cathode portion 24 on the capacitor mounted electrode face, through holes are formed in a plurality of portions in, for example, a glass epoxy layer making up the insulating substrate $26a$. An anode terminal forming portion $28a$ (plating formed face) obtained by performing plating on a face (concave portion) outside of the anode portion 23 (on the left end side of the anode portion 23 in FIG. 3) on the capacitor mounted electrode face, that is, on the face exposed on the outside face of the anode of the lower-face electrode type solid electrolytic capacitor 100 and a cathode terminal forming portion $28b$ (plating formed face) obtained by performing plating on a face (concave portion) outside of the cathode portion 24 (on the right end side of the cathode portion 24 in FIG. 3) on the capacitor mounted electrode face, that is, on the face exposed on the outside face of the cathode of the lower-face electrode type solid electrolytic capacitor 100 and, such plated portions can be used later as fillet forming faces (anode fillet forming portion and cathode fillet forming portion).

Figure 2:
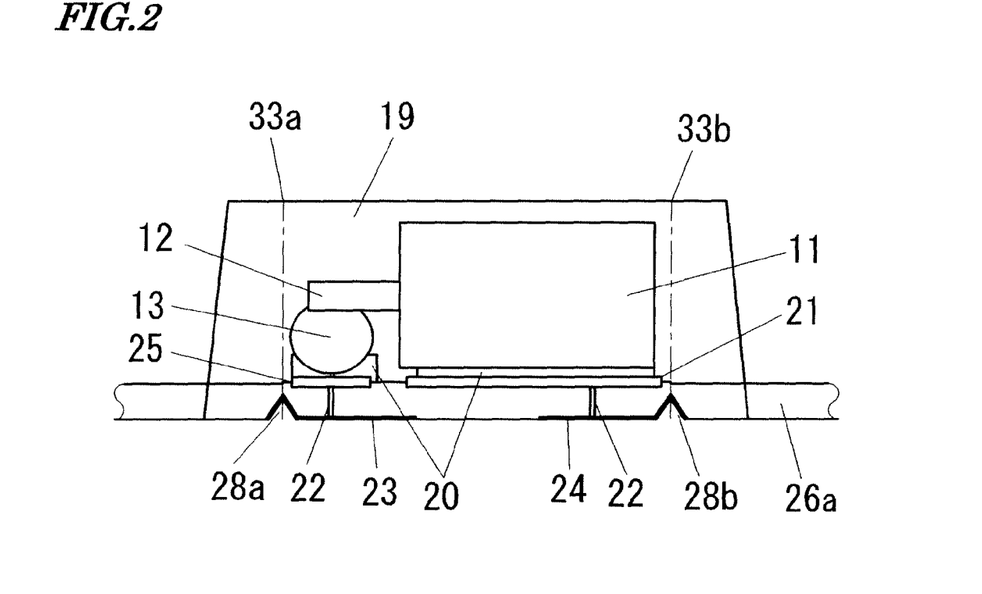
FIG. 2 is an internal perspective view explaining a manufacturing process of the lower-face electrode type solid electrolytic capacitor according to the first exemplary embodiment of the present invention.

The converting substrate 26 having the above configurations is resin-sheathed with the sheathing resin 19 by a molding method or a like, as shown in FIG. 2. Then, by cutting both the sheathing resin 19 and converting substrate 26 along cutting planes 33a and 33b, each of the plating formed faces in each of the concave portions is partitioned and, as a result, each of the fillet forming faces 15a and 15b is formed on each of inclined planes obtained by removing an angular portion corresponding to an angle formed by a lower face and a side end face of the converting substrate 26, thus bringing the lower-face electrode mounted electrode type solid electrolytic capacitor 200 to perfection.

Second Exemplary Embodiment

Next, a lower-face electrode type electrolytic capacitor of the second exemplary embodiment of the present invention is described by referring to FIGS. 5 to 7. FIGS. 5A, 5B, 5C, and 5D are a diagram showing a lower-face electrode type solid electrolytic capacitor 200 according to the second exemplary embodiment of the present invention, FIG. 5A is a side view showing an anode side of the solid electrolytic capacitor 200, FIG. 5B is an internal perspective view seen from a front side of the solid electrolytic capacitor 200, and FIG. 5C is an internal perspective view seen from a rear side of the solid electrolyte capacitor 200 and FIG. 5D is a side view showing a cathode side of the solid electrolytic capacitor 200. In FIG. 5, the reference number 11 shows a capacitor element, the number 12 shows an anode lead line, the number 13 shows a metal piece, the number 15c shows a plated fillet forming face on an anode side, the number 15d shows a plated fillet forming face on a cathode side, the number 16 shows a cutting plane on the anode side, the number 17 shows a cutting plane on the cathode side, the number 19 is a sheathing resin, the number 20 is a conductive adhesive, the number 21 shows a cathode portion on a capacitor element connecting face, the number 22 shows through holes, the number 23 shows an anode portion on the capacitor element connecting face, the number 24 shows a cathode portion on the capacitor mounted electrode face, the number 25 shows an anode portion of the capacitor element connecting face, and the number 36 shows a converting substrate. Configurations of the second exemplary embodiment differ from those of the first exemplary embodiment in that, in the lower-face electrode type solid electrolytic capacitor 100 of the first exemplary embodiment, the converting substrate 26 having a single terminal is used, however, in the lower-face electrode type solid electrolytic capacitor 200 of the second exemplary embodiment, as shown in FIGS. 5A to 5D, the converting substrate 36 having multiple terminals is used.

Figure 7A:
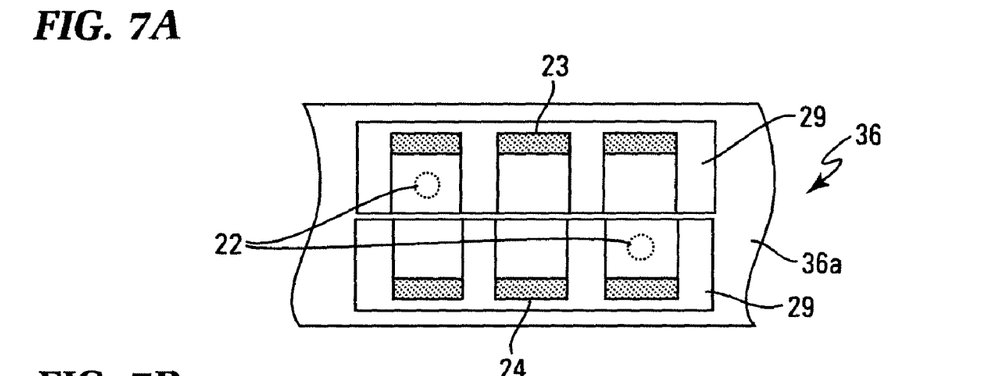
FIG. 7A is a plan view of the converting substrate seen from a side of a capacitor mounted electrode face.
Figure 7B:
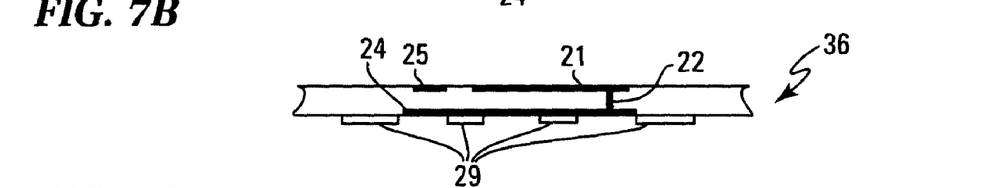
FIG. 7B is a cross-sectional view of the converting substrate seen from its cathode side.
Figure 7C:
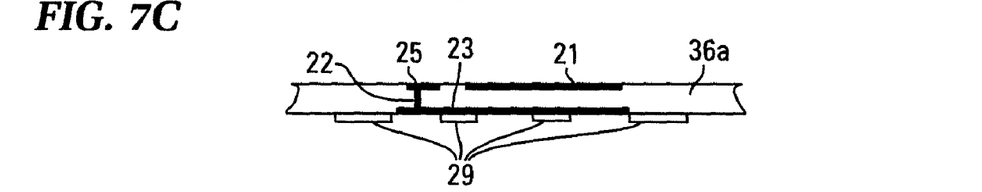
FIG. 7C is a cross-sectional view of the converting substrate seen from its an anode side.
Figure 7D:
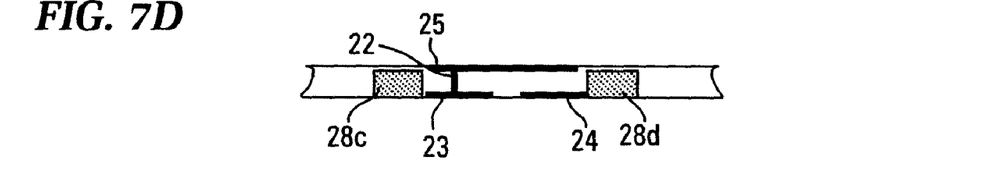
FIG. 7D is a cross-sectional view seen from its front side.

Next, the converting substrate 36 making up the lower-face electrode type solid electrolytic capacitor 200 of the second exemplary embodiment is described by referring to FIGS. 7A, 7B, 7C, and 7D. FIGS. 7A, 7B, 7C, and 7D are a diagram showing configurations of a converting substrate 36 employed in the second exemplary embodiment of the present invention, FIG. 7A is a plan view of the converting substrate 36 seen from a side of a capacitor mounted electrode face, FIG. 7B is a cross-sectional view of the converting substrate 36 seen from its cathode side, FIG. 7C is a cross-sectional view of the converting substrate 36 seen from its an anode side, and FIG. 7D is a cross-sectional view seen from its front side. In FIGS. 7A, 7B, 7C, and 7D, the reference number 25 shows an anode portion on a capacitor element connecting face coupled to a metal piece 13 (anode lead line 12) through the conductive adhesive 20, and the number 24 is an anode portion on a capacitor mounted electrode face. To achieve electric conduction between the anode portion 25 on the capacitor element connecting face and the anode portion 23 on the capacitor mounted electrode face and between the cathode portion 21 on the capacitor element connecting face and the cathode portion 24 on the capacitor mounted electrode face, through holes are formed in a plurality of portions in, for example, a glass epoxy layer with, for example, a thickness of 100 to 120 μm making up the insulating substrate 26a. Moreover, in order to form multiple terminals, surfaces of terminals are partitioned by an insulator 29. Then, an anode terminal forming portion 28c obtained by performing plating on a face (concave portion) outside of the anode portion 23 (on the left end side of the anode portion 23 in FIG. 7) on the capacitor mounted electrode face, that is, on the face exposed on the outside face of the anode of the lower-face electrode type solid electrolytic capacitor 200 and a cathode terminal forming portion 28d obtained by plating a face (concave portion) exposed outside of the cathode portion 24 (on the right end side of the cathode portion 24 in FIG. 7) on the capacitor mounted electrode face, that is, on the face exposed on the outside face of the cathode of the lower-face electrode type solid electrolytic capacitor 200 and, such plated portions can be used later as fillet forming faces.

The converting substrate 36 having the above configurations, after being coupled to the capacitor element 11, is resin-sheathed with the sheathing resin 19 by a molding method or a like. Then, by cutting both the sheathing resin 19 and converting substrate 36 along cutting planes 44a and 44b, each of the plating formed faces 28c and 28d is separated and, as a result, each of the fillet forming faces 15c and 15d is formed, thus bringing the lower-face electrode mounted electrode type solid electrolytic capacitor 200 to perfection.

Third Exemplary Embodiment

Next, a layer-stacked type solid electrolytic capacitor of the third exemplary embodiment is described by referring to FIGS. 8A, 8B, 8C, and 8D to FIG. 10, in which a capacitor element having multiple terminals made up of an anode body obtained by widening a surface area of a plate-like or foil-like valve metal coated with an anodic oxide film and of a solid electrolyte of a conductive polymer are connected to one another in a layer-stacked manner and in which cathodes of the capacitor elements connected adjacently in a layer-stacked direction are coupled thereto.

Figure 8A:
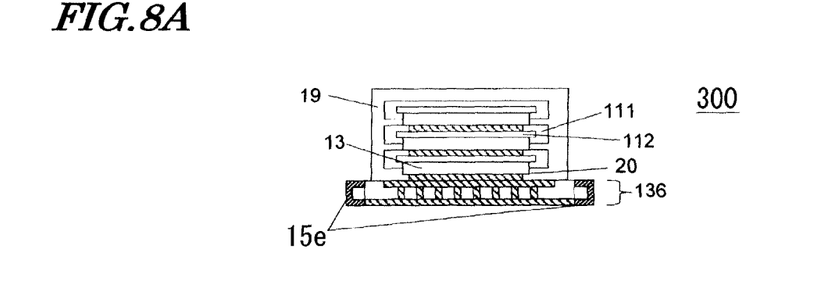
FIG. 8A is an internal perspective view of its anode portion.
Figure 8B:
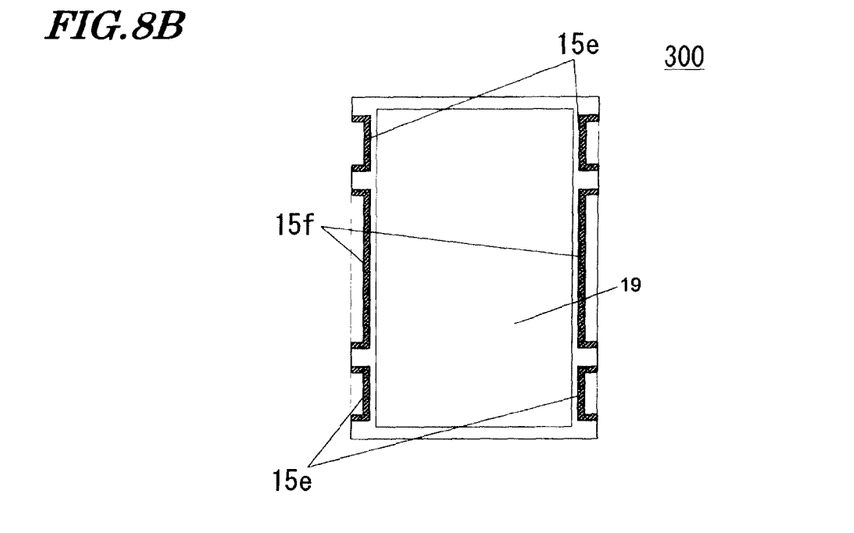
FIG. 8B is a top view of the solid electrolytic capacitor.
Figure 8C:
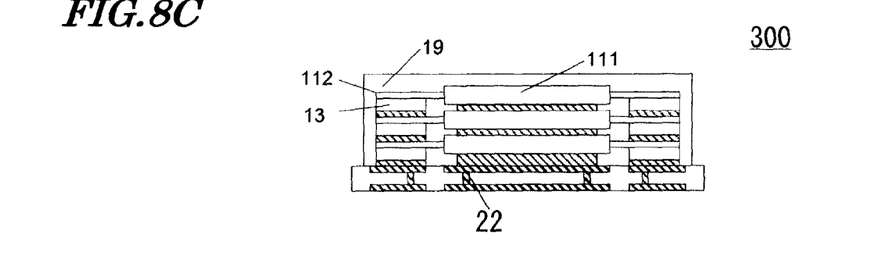
FIG. 8C is an internal perspective view from its side.
Figure 8D:
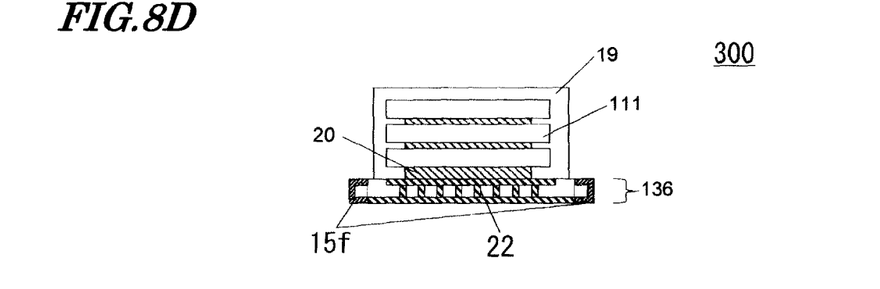
FIG. 8D is an internal perspective view of its cathode portion.

FIGS. 8A, 8B, 8C, and 8D are a diagram showing a layer-stacked lower-face electrode type solid electrolytic capacitor 300 according to the third exemplary embodiment of the present invention, FIG. 8A is an internal perspective view of its anode portion, FIG. 8B is a top view of the solid electrolytic capacitor, FIG. 8C is an internal perspective view from its side, and FIG. 8D is an internal perspective view of its cathode portion. In FIGS. 8A, 8B, 8C, and 8D, the reference number 111 shows capacitor elements, the number 112 shows anode lead lines, the number 13 shows a metal piece, the number 15e shows a plated fillet forming face (anode fillet forming portion) on an anode side, the number 15f shows a plated fillet forming face (cathode fillet forming portion) on a cathode side, the number 19 shows a sheathing resin, the number 20 shows a conductive adhesive, and the number 136 shows a converting substrate.

Figure 9A:
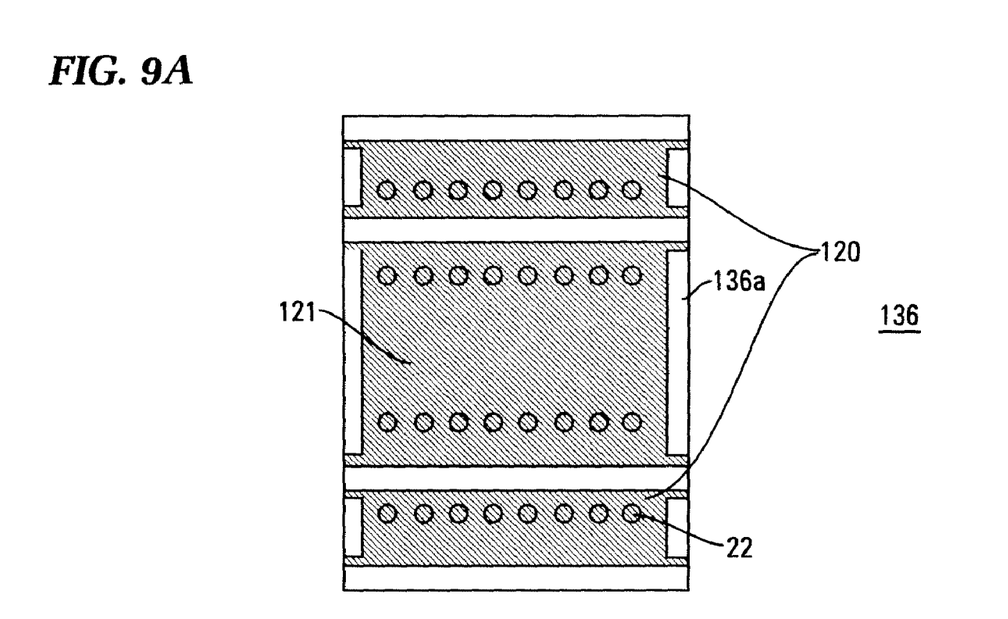
FIG. 9A is a plan view of the converting substrate seen from a side of a capacitor mounted electrode face.
Figure 9B:
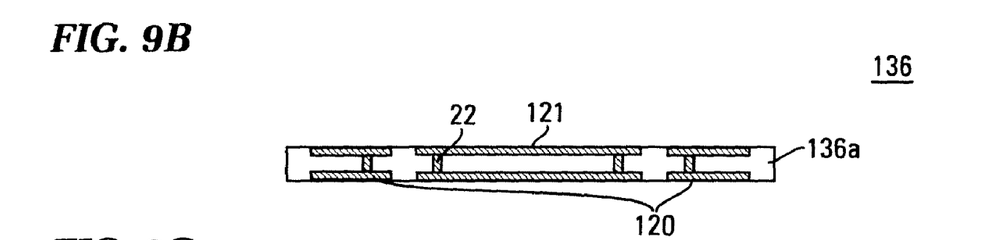
FIG. 9B is a cross-sectional view of the converting substrate.
Figure 9C:
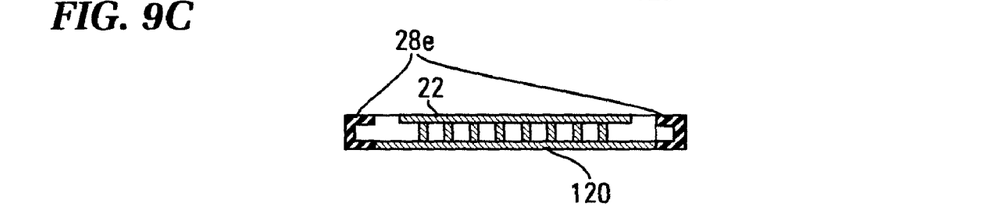
FIG. 9C is a cross-sectional view of the anode portion.
Figure 9D:
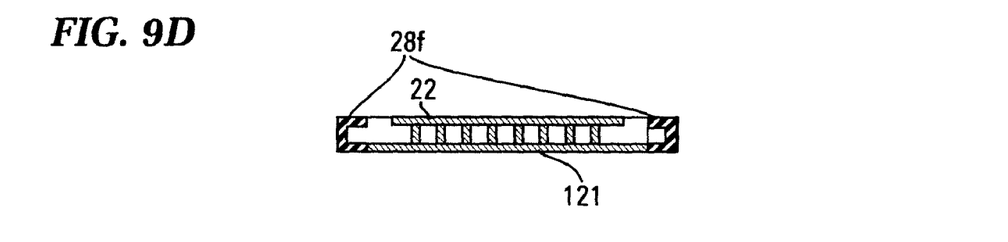
FIG. 9D is a cross-sectional view of the cathode portion.

FIGS. 9A, 9B, 9C, and 9D are a diagram showing configurations of a converting substrate 136 employed in the third exemplary embodiment of the present invention, FIG. 9A is a plan view of the converting substrate 136 seen from a side of a capacitor mounted electrode face, FIG. 9B is a cross-sectional view of the converting substrate 136, FIG. 9C is a cross-sectional view of its anode portion, and FIG. 9D is a cross-sectional view of its cathode portion. In FIGS. 9A, 9B, 9C, and 9D, the converting substrate 136 is made of the insulating substrate 136a such as a glass epoxy resin with a thickness of about 200 μm and, on each of the upper and lower faces of the insulating substrate 136a, the anode portion 120 and cathode portion 121 are formed and the anode portion 120 on the upper face is connected via the through hole 22 to the anode portion 120 on the lower face and the cathode portion 121 on the upper face is connected via the through hole 22 to the cathode portion 121. The anode portion 120 is coupled to the metal piece 13 (anode lead line 112) through the conductive adhesive 20. The cathode portion 121 is coupled through the conductive adhesive 20 to the capacitor element 111. An anode terminal forming portion 28e obtained by performing plating on a face (through hole) outside of the anode portion 120 on the capacitor mounted electrode face, that is, on the face exposed from the outside face of the anode of the lower-face electrode type solid electrolytic capacitor 300 toward its upper face and a cathode terminal forming portion 28f obtained by performing plating on a face (through hole) outside of the cathode portion 121 on the capacitor mounted electrode face, that is, on the face exposed from the outside face of the cathode of the lower-face electrode type solid electrolytic capacitor 300 toward its upper face and such plated portions can be used later as fillet forming faces.

The converting substrate 136 having the above configurations, after being coupled to the layer-stacked capacitors 111, is sheathed with a sheathing resin 19 by using a molding method. Then, by cutting both the sheathing resin 19 and converting substrate 136 along a cutting plane 44a, the plating formed faces 28e and 28f each being of a through-hole structure is partitioned and, as a result, as shown in FIGS. 8A, 8B, 8C, and 8D, the fabrication of a layer-stacked lower-face electrode type solid electrolytic capacitor 300 is completed.

Figure 11:
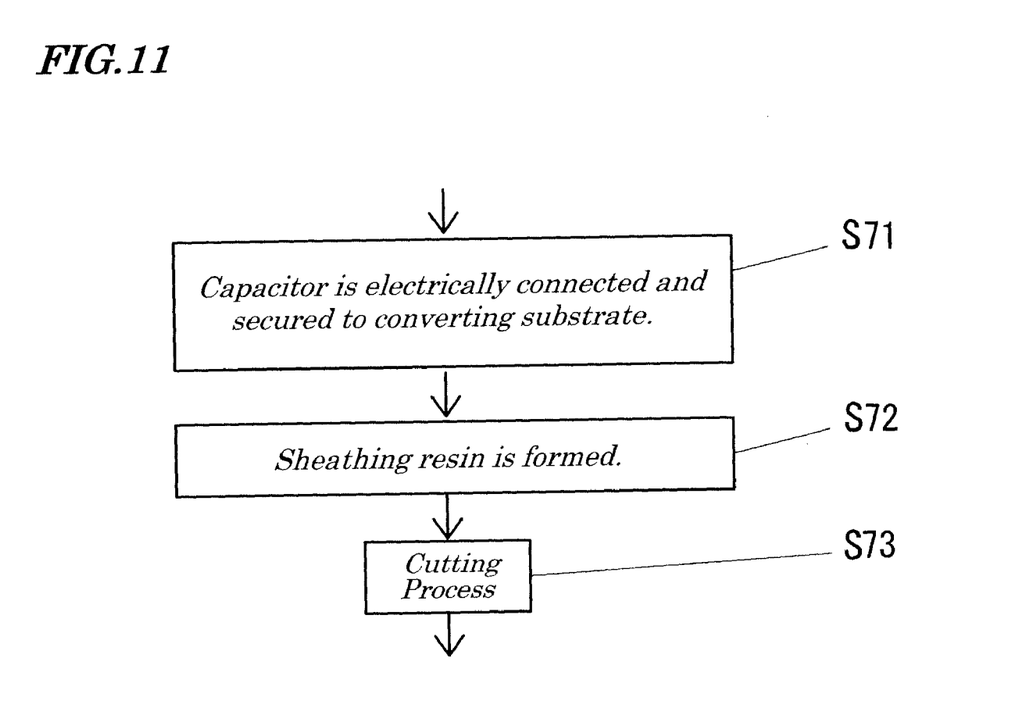
FIG. 11 is a process flow showing manufacturing processes of the lower-face electrode solid electrolytic capacitors of the first to third exemplary embodiments of the present invention.

FIG. 11 is a process flow showing manufacturing processes of the lower-face electrode solid electrolytic capacitors 100, 200, and 300 of the first to third exemplary embodiments of the present invention. The Step S71 shows a process of electrically coupling and securing a capacitor element to a converting substrate. The Step S72 shows a process of forming a sheathing resin. The Step S73 shows a process of cutting the converting substrate and sheathing resin. Through these processes, the fabrication of the lower-face electrode type solid electrolytic capacitors 100, 200, and 300 is completed.

EXAMPLE 1

Next, the present invention is explained by referring to examples in detail. The capacitor element 11 (FIG. 2) is fabricated by known technology and its description is omitted and, therefore, the case in which tantalum is used as a valve metal is explained. Tantalum powder is formed around tantalum lines by using a pressing machine and the pressed tantalum powder is sintered in a high vacuum and at a high temperature. Next, a film of tantalum oxide ($Ta_2O_5$) is formed on a surface of the tantalum metal powder. Moreover, the film of tantalum oxide, after being is soaked in a manganese solution, is thermally cracked to form manganese oxide ($MnO_2$) and, continuously, a cathode layer made of graphite and silver (Ag) is formed to obtain the capacitor element 11. By using a conductive polymer such as polythiophen, polypyrrole, or a like, as the material, instead of manganese oxide ($MnO_2$), it is made to easily obtain an ESR (Equivalent Series Resistor) of the capacitor element. Moreover, as the valve metal, in addition to tantalum, niobium, aluminum, titanium, or a like can be used.

Next, the configuration of the converting substrate 26 is explained. In the converting substrate 26 of the Example 1, as shown in FIGS. 3A and 3B, on the upper face of the insulating substrate 26a are formed the anode portion 25 and cathode 21 on the capacitor connecting face, which are electrically coupled to the capacitor element 11 through the conductive adhesive 20, and, on the capacitor mounted electrode face are formed the anode portion 23 and cathode portion 24 on the mounted electrode face, which serve as electrodes for capacitor mounting. To achieve electric conduction between the anode portion 25 on the capacitor element connecting face and the anode portion 23 on the capacitor mounted electrode face and between the cathode portion 21 on the capacitor element connecting face and the cathode portion 24 on the capacitor mounted electrode face, through holes are formed in a plurality of portions in the substrate. Then, an anode terminal forming portion 28a obtained by forming notches and performing plating on a face outside of the anode portion 23 on the capacitor mounted electrode face, that is, on the face exposed on the outside face of the anode of the lower-face electrode type solid electrolytic capacitor and a cathode terminal forming portion 28b obtained by forming notches and performing plating on a face outside of the cathode portion 24 on the capacitor mounted electrode face, that is, on the face exposed on the outside face of the end face and, thus, by forming such the plated portions, the converting substrate 26 of a structure being able to be used as fillet forming faces 15a and 15b.

To electrically couple the capacitor element 11 to the converting substrate 26, as shown in FIG. 1, on the anode side of the electrolytic capacitor, the anode lead 12 was first connected to the metal piece 13 by resistance welding or a like and then, through the conductive adhesive 20 containing Ag, was connected to the anode portion 25 on the capacitor element connecting face of the converting substrate 26. An example of materials for the metal piece includes 42 alloy (iron 42 wt/%) piece, copper, or a like. On the cathode side of the electrolytic capacitor, the capacitor element 11 was electrically connected to the cathode portion 21 on the capacitor element connecting face of the converting substrate 26 by the conductive adhesive 20 containing Ag. Then, after performing the sheathing process by thermal molding using a glass-containing epoxy resin, liquid crystal polymer, transfer-molding resin, and liquid epoxy resin as the sheathing resin, four faces making up an outside face of the lower-face electrode type solid electrolytic capacitor were cut, using a dicing saw, to obtain the lower-face electrode type solid electrolytic capacitor 100.

Moreover, by cutting the sheathing resin 19 and the converting substrate 26 so that part of each of the notches 28a and 29b making up the plating formed face is exposed without fail, the lower-face electrode type solid electrolytic capacitor 100 could be fabricated.

As a result, the lower-face electrode type solid electrolytic capacitor of the example 1, unlike the conventional lower-face electrode type solid electrolytic capacitor, requires no formation of the concave portion of electrode terminals within outer dimensions of the lower-face electrode type solid electrolytic capacitor and, therefore, has a superiority in that volume efficiency of the capacity element can be improved. Moreover, the fillet forming faces can be formed in a stable state.

EXAMPLE 2

Figure 4:
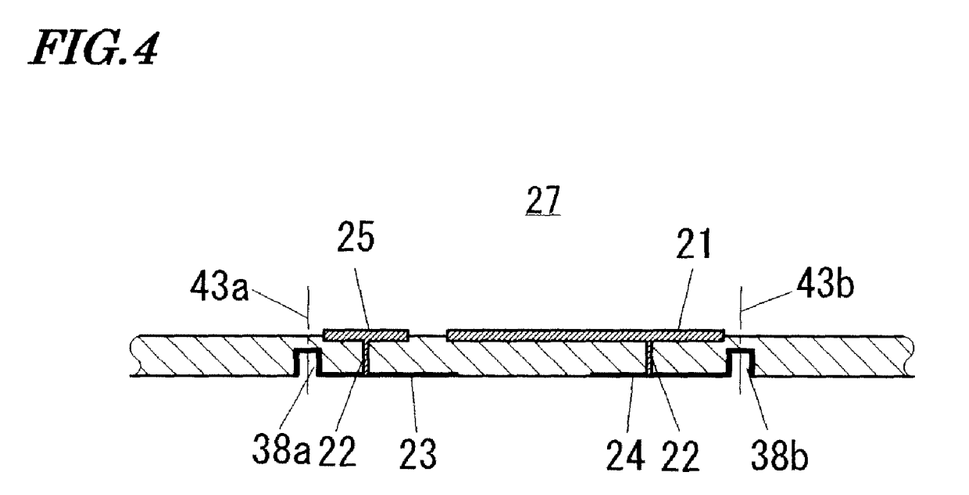
FIG. 4 is a cross-sectional view making up a configuration of a converting substrate employed in the first exemplary embodiment.
Figure 5A:
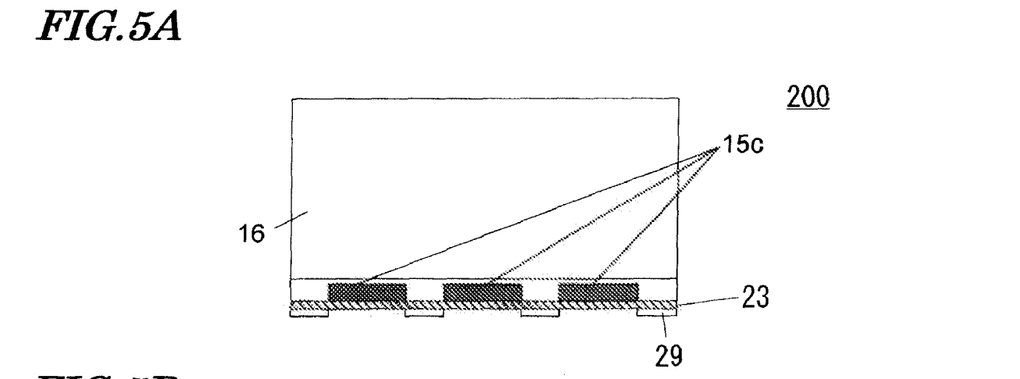
FIG. 5A is a side view showing an anode side of the solid electrolytic capacitor.
Figure 5B:
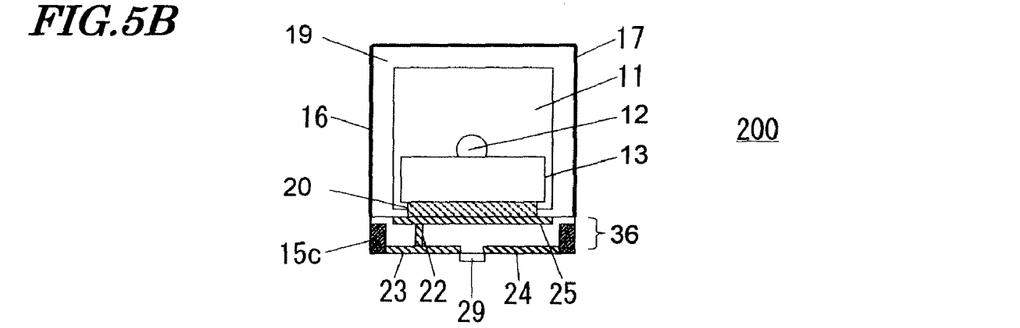
FIG. 5B is an internal perspective view from its front.
Figure 5C:
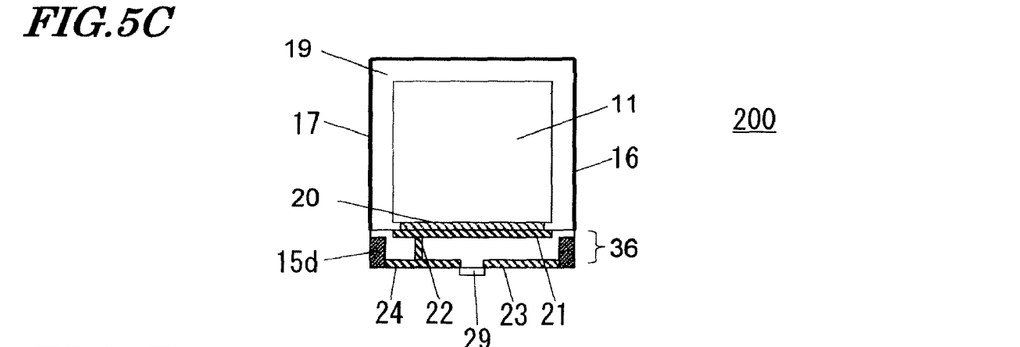
Figure 5D:
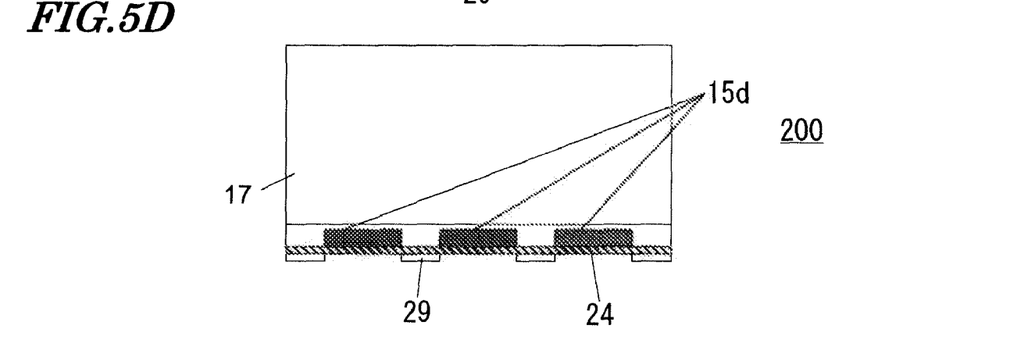
Figure 6:
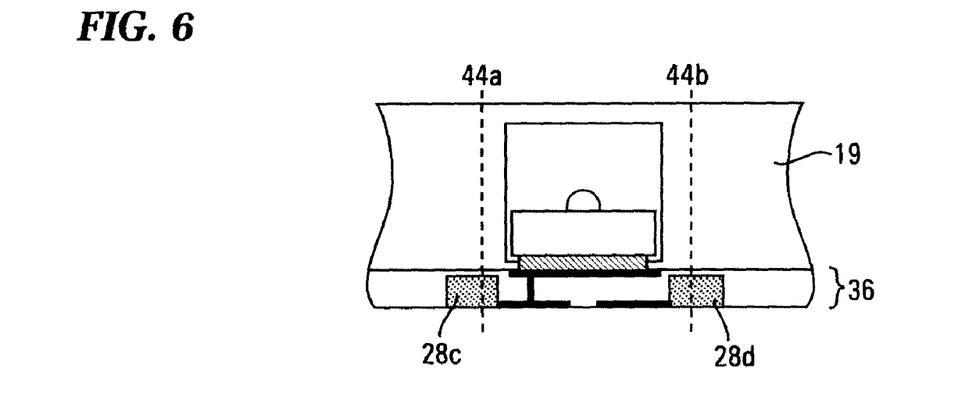
FIG. 6 is a diagram explaining a converting substrate 36 making up the lower-face electrode type solid electrolytic capacitor of the second exemplary embodiment of the present invention.

Next, the example 2 of the present invention is described by referring to drawings. FIG. 4 is the cross-sectional view making up the configuration of the converting substrate employed in the example 2 and cutting planes 43a and 43b are shown by dash and dotted lines. The cross-sectional shapes of the notches 38a and 38b formed in the converting substrate 27 employed in the example 2, as shown in FIG. 4, are U-shaped so that a large margin for cutting with the dicing saw is provided. Configurations other than above are the same as in the example 1.

EXAMPLE 3

Next, the example 3 of the present invention is described. In the converting substrate 36 of the example 3, as shown in FIGS. 7A, 7B, 7C, and 7D, on the upper face of the insulating substrate 36a with a thickness of about 100 μm to 120 μm were formed the anode portion 25 electrically connected to the capacitor element through the conductive adhesive and the cathode portion 21 and on the capacitor mounting face on the opposite side were formed the anode portion 23 and cathode portion 24 on the capacitor mounted electrode face. To achieve electric conduction between the anode portion 25 on the capacitor element connecting face and the anode portion 23 on the capacitor mounted electrode face and between the cathode portion 21 on the capacitor element connecting face and the cathode portion 24 on the capacitor mounted electrode face, through holes 22 were formed in the insulating substrate 36a in a plurality of portions. Moreover, in order to form multiple terminals, the surfaces of the terminals were partitioned by the insulator 29. Then, an anode terminal forming portion 28c obtained by forming notches and performing plating on a face outside of the anode portion 23 (on the left end side of the anode portion 23 in FIG. 7) on the capacitor mounted electrode face, that is, on the face exposed on the outside face of the anode of the lower-face electrode type solid electrolytic capacitor 200 and a cathode terminal forming portion 28d obtained by forming notches and performing plating on a face outside of the cathode portion 24 (on the right end side of the cathode portion 24 in FIG. 7) on the capacitor mounted electrode face, that is, on the face exposed on the outside face of the cathode of the lower-face electrode type solid electrolytic capacitor 200 and, thus, by forming the plated portions, the converting substrate 36 of a structure that can be used as the fillet forming faces 15c and 15d. Then, to electrically connect the capacitor element 11 to the converting substrate 36, the anode lead 12 was first connected to the metal piece 13 by resistance welding or a like and, then, through the conductive adhesive 20 containing Ag, was connected to the anode portion 25 on the capacitor element connecting face of the converting substrate 36. An example of materials for the metal piece includes 42 alloy (iron 42 wt/%) piece, copper, or a like. On the cathode side of the electrolytic capacitor, the capacitor element 11 was electrically connected to the cathode portion 21 on the capacitor element connecting face of the converting substrate 26 by the conductive adhesive 20 containing Ag. Then, after performing the sheathing process by thermal molding using a glass-containing epoxy resin, liquid crystal polymer, transfer-molding resin, and liquid epoxy resin as the sheathing resin, four faces making up an outside face of the lower-face electrode type solid electrolytic capacitor were cut, using a dicing saw, to obtain the lower-face electrode type solid electrolytic capacitor of the example 3.

Moreover, by cutting the sheathing resin 19 and the converting substrate 36 so that part of each of the notches 28a and 29b making up the plating formed faces (anode terminal forming portion 28c and cathode terminal forming portion 28d) was exposed without fail, the lower-face electrode type solid electrolytic capacitor of the example 3 could be fabricated.

As a result, the lower-face electrode type solid electrolytic capacitor of the example 3, unlike the conventional lower-face electrode type solid electrolytic capacitor, requires no formation of the concave portion of electrode terminals within outer dimensions of the lower-face electrode type solid electrolytic capacitor and, therefore, has a superiority in that volume efficiency of the capacity element can be improved. Moreover, the fillet forming faces can be formed in a stable state.

EXAMPLE 4

Next, the example 4 of the present invention is described. First, the capacitor element 111 can be fabricated by known technology and its description is omitted accordingly. A film of aluminum oxide ($Al_2O_3$) is formed on an aluminum foil a surface area of which is widened and further thereon one cathode layer made up of a conductive polymer layer, a graphite layer, and an silver (Ag) layer is formed. By forming two anode terminals separated by insulation using an oxide film near the cathode, a capacitor element 111 of a three-terminal parallel connection structure can be obtained. The capacitor element is not limited to one and a plurality of capacitor elements can be used as a layer-stacked capacitor element by providing conduction among cathode portions and anode portions of the plurality of capacitor elements (in this example, as shown in FIG. 9, in the example 4, as shown in FIG. 9, the cathode portion 121 is sandwiched between a right anode 120 and a left anode 120, which make up a pair of anodes.)

Figure 10:
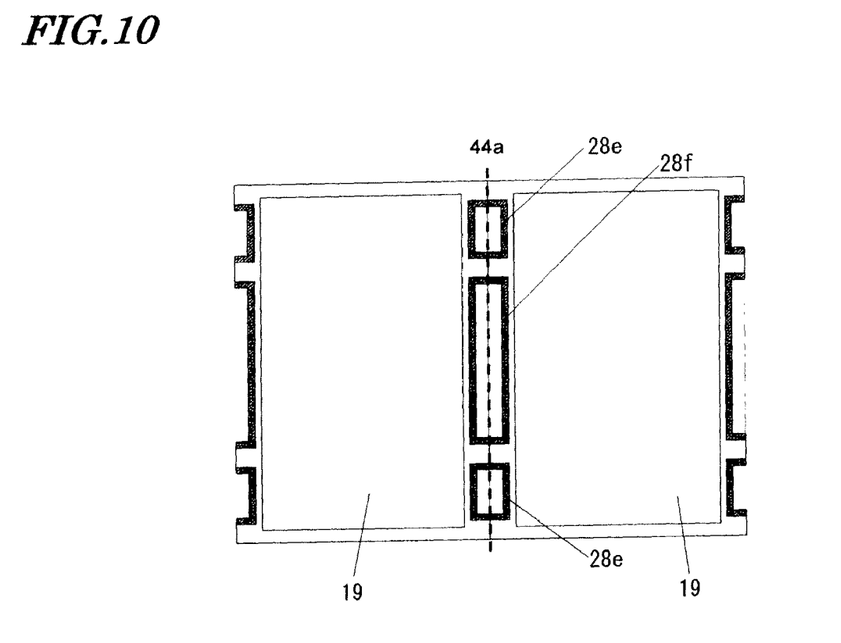
FIG. 10 is an internal perspective view explaining a manufacturing process of the lower-face electrode type solid electrolytic capacitor according to the third exemplary embodiment of the present invention.

Next, configurations of the converting substrate of the example 4 are described by referring to FIG. 9. In the converting substrate 136 of the example 4, as shown in FIGS. 9A, 9B, 9C, and 9D, anode portions 120 and 120 and cathode portion 121, both being electrically coupled to the capacitor element through the conductive adhesive, are formed on an upper face of the insulating substrate (in the example 4, as shown in FIG. 9, the cathode portion 121 is sandwiched between a right anode 120 and a left anode 120, which make up a pair of anodes). Then, an anode terminal forming portion 28e obtained by forming notches having a through-hole structure and performing plating on faces outside of the anode portions 120 and 120 on the capacitor mounted electrode face, that is, on the face exposed from the outside face of the anode of the lower-face electrode type solid electrolytic capacitor toward its upper face and a cathode terminal forming portion 28f obtained by forming notches having a through-hole structure and plating faces outside of the cathode portion 121 on the capacitor mounted electrode face, that is, on the face exposed from the outside face of the anode of the lower-face electrode type solid electrolytic capacitor toward its upper face and, thus, by forming the plated portions, the converting substrate 136 of a structure that can be used as the fillet forming faces 15a and 15b. To electrically connect the capacitor element 11 to the converting substrate 136 on the anode side of the electrolytic capacitor, the anode lead 112 was first connected to the metal piece 13 by resistance welding or a like and then, through the conductive adhesive 20 containing Ag, was connected to the anode portion 120 on the capacitor element connecting face of the converting substrate 136. An example of materials for the metal piece includes 42 alloy (iron 42 wt/%) piece, copper, or a like. On the cathode side of the electrolytic capacitor, the capacitor element 111 was electrically connected to the cathode portion 121 on the capacitor element connecting face of the converting substrate 136 by the conductive adhesive 20 containing Ag. Then, after performing the sheathing process by thermal molding using a glass-containing epoxy resin, liquid crystal polymer, transfer-molding resin, and liquid epoxy resin as the sheathing resin, as shown in FIG. 10, the lower-face electrode type solid electrolytic capacitor were cut along the cutting plane 44a, using a dicing saw, to obtain the lower-face electrode type solid electrolytic capacitor of the example 4.

Moreover, by cutting the sheathing resin and the converting substrate 136 so that a part of each of the plating formed faces 28e and 28f is exposed without fail, the lower-face electrode type solid electrolytic capacitor could be fabricated.

As a result, the lower-face electrode type solid electrolytic capacitor of the example 4, unlike the conventional lower-face electrode type solid electrolytic capacitor, requires no formation of the plating formed face within outer dimensions of the lower-face electrode type solid electrolytic capacitor and, therefore, has a superiority in that volume efficiency of the capacity element can be improved. Moreover, the fillet forming faces can be formed in a stable state.

While the invention has been particularly shown and described with reference to exemplary embodiments thereof, the invention is not limited to theses embodiments. It will be understood by those of ordinary skill in the art that various changes in form and details may be made therein without departing from the spirit and scope of the present invention as defined by the claims.

What we claim is:

1. A solid electrolytic capacitor comprising:
   a capacitor element having an anode portion made of a valve metal, a dielectric layer made of an oxide of said valve metal, and a cathode portion made of a solid electrolyte layer; and
   a converting substrate being electrically connected to said capacitor element on its upper face and having an anode terminal and cathode terminal as a pair of electrode terminals for mounting the solid electrolytic capacitor on its lower face;
   wherein, in a specified region on a side end face of said converting substrate, a plated anode fillet forming portion and plated cathode fillet forming portion are formed which control fillets formed when said anode terminal and said cathode terminal on the lower face of said converting substrate are each soldered to a corresponding portion of a circuit substrate, whereby the solid electrolytic capacitor is mounted on said circuit substrate.

2. The electrolytic capacitor according to claim 1, wherein said anode portion and said dielectric layer are integrally formed by widening an area of the plate-like or foil-like valve metal and by coating the valve metal with an anode oxide film and wherein said solid electrolyte layer making up said cathode portion is made of a conductive polymer.

3. The electrolytic capacitor according to claim 1, wherein said plated anode fillet forming portion and plated cathode fillet forming portion are formed in a manner to be extended from said anode terminal and said cathode terminal on said lower face of said converting substrate.

4. The solid electrolytic capacitor according to claim 1, wherein said plated anode fillet forming portion and said plated cathode fillet forming portion are formed on an inclined face or concave face obtained by removing an angular portion corresponding to an angle formed by said lower face and said side end face of said converting substrate.

5. The solid electrolytic capacitor according to claim 1, wherein said plated anode fillet forming portion and said plated cathode fillet forming portion are formed on a concave face formed on said side end face of said converting substrate.

6. The solid electrolytic capacitor according to claim 1, further comprising multiple terminals in the direction of a length on a capacitor mounting face.

7. The solid electrolytic capacitor according to claim 1, wherein said capacitor element comprises a layer-stacked type capacitor element in which a plurality of capacitor elements is stacked in layers.

8. A method of manufacturing the solid electrolytic capacitor including:
   a capacitor element having an anode portion made of a valve metal, a dielectric layer made of an oxide of said valve metal, and a cathode portion made of a solid electrolyte layer; and
   a converting substrate being electrically connected to said capacitor element on its upper face and having an anode terminal and cathode terminal as an electrode terminal for mounting a capacitor on its lower face;
   wherein, in a specified region on a side end face of said converting substrate, a plated anode fillet forming portion and plated cathode fillet forming portion are formed which control fillets formed when said anode terminal on the lower face of said converting substrate is soldered to said cathode terminal comprising the following steps:
   a step of bonding a capacitor element to a converting substrate, on an upper face of which there are formed at least one anode region and at least one cathode region for being electrically connected to said capacitor element, and on a lower face of which there are formed at least one anode terminal and at least one cathode terminal as an electrode terminal for mounting a capacitor, at least one first plated concave portion or at least one first plated through hole for forming a plated anode fillet forming portion, and at least one second plated concave portion or at least one second plated through hole for forming a plated cathode fillet forming portion, and said capacitor element having an anode portion made of a valve metal, a dielectric layer made of an oxide of said valve metal, and a cathode portion made of a solid electrolyte layer;
   a step of coating upper faces of said capacitor element and said converting substrate with a sheathing resin; and
   a step of completing said plated anode fillet forming portion and said plated cathode fillet forming portion by cutting said converting substrate and said sheathing rein in a manner to partition said first and second plated concave faces or said first and second plated through holes.

* * * * *